United States Patent
Cheung et al.

(10) Patent No.: US 8,670,324 B2
(45) Date of Patent: Mar. 11, 2014

(54) FAIR WEIGHTED NETWORK CONGESTION AVOIDANCE

(75) Inventors: C. F. Pat Cheung, Tuen Mun (CN); Piu Bill Wong, Causeway Bay (CN); Hang Ching Jason Leung, Yuen Long (CN)

(73) Assignee: FiMax Technology Limited, George Town, Grand Cayman (KY)

( * ) Notice: Subject to any disclaimer, the term of this patent is extended or adjusted under 35 U.S.C. 154(b) by 923 days.

(21) Appl. No.: 12/182,775

(22) Filed: Jul. 30, 2008

(65) Prior Publication Data

US 2010/0027425 A1 Feb. 4, 2010

(51) Int. Cl.
 H04L 12/26 (2006.01)

(52) U.S. Cl.
 USPC .......................................... 370/238

(58) Field of Classification Search
 None
 See application file for complete search history.

(56) References Cited

U.S. PATENT DOCUMENTS

| | | | |
|---|---|---|---|
| 6,930,983 B2 * | 8/2005 | Perkins et al. | 370/252 |
| 6,996,062 B1 * | 2/2006 | Freed et al. | 370/235 |
| 7,787,370 B1 * | 8/2010 | Aweya et al. | 370/230 |
| 7,813,365 B2 * | 10/2010 | Brewer et al. | 370/414 |
| 2002/0186665 A1 * | 12/2002 | Chaffee et al. | 370/255 |
| 2006/0062233 A1 * | 3/2006 | Brewer et al. | 370/412 |
| 2006/0215551 A1 * | 9/2006 | Narvaez et al. | 370/229 |
| 2007/0070907 A1 * | 3/2007 | Kumar et al. | 370/235 |
| 2009/0067335 A1 * | 3/2009 | Pelletier et al. | 370/238 |
| 2009/0285196 A1 * | 11/2009 | Lee et al. | 370/345 |
| 2011/0032821 A1 * | 2/2011 | Morrill et al. | 370/230 |

\* cited by examiner

*Primary Examiner* — Rhonda Murphy
(74) *Attorney, Agent, or Firm* — Fulbright & Jaworski LLP

(57) ABSTRACT

Systems and methods which provide network congestion avoidance implementing a fairness scheme in which a cost function is used are shown. Transmission cost, for use in network congestion avoidance packet dropping decisions, may be determined from an amount of air time needed to transmit a data packet, a transmission data rate, a size of a packet, an amount of spectral energy or transmit power associated with transmission, etc. A packet dropping probability for a particular packet is preferably determined as a function of the current flow cost and average flow cost to provide fair allocation of network communications resources. Embodiments additionally implement buffer based packet dropping probability calculation in order to provide a robust network congestion avoidance technique. Cost based packet dropping probability calculation and buffer based packet dropping probability calculation implemented according to embodiments are adapted to accommodate quality of service applications.

16 Claims, 5 Drawing Sheets

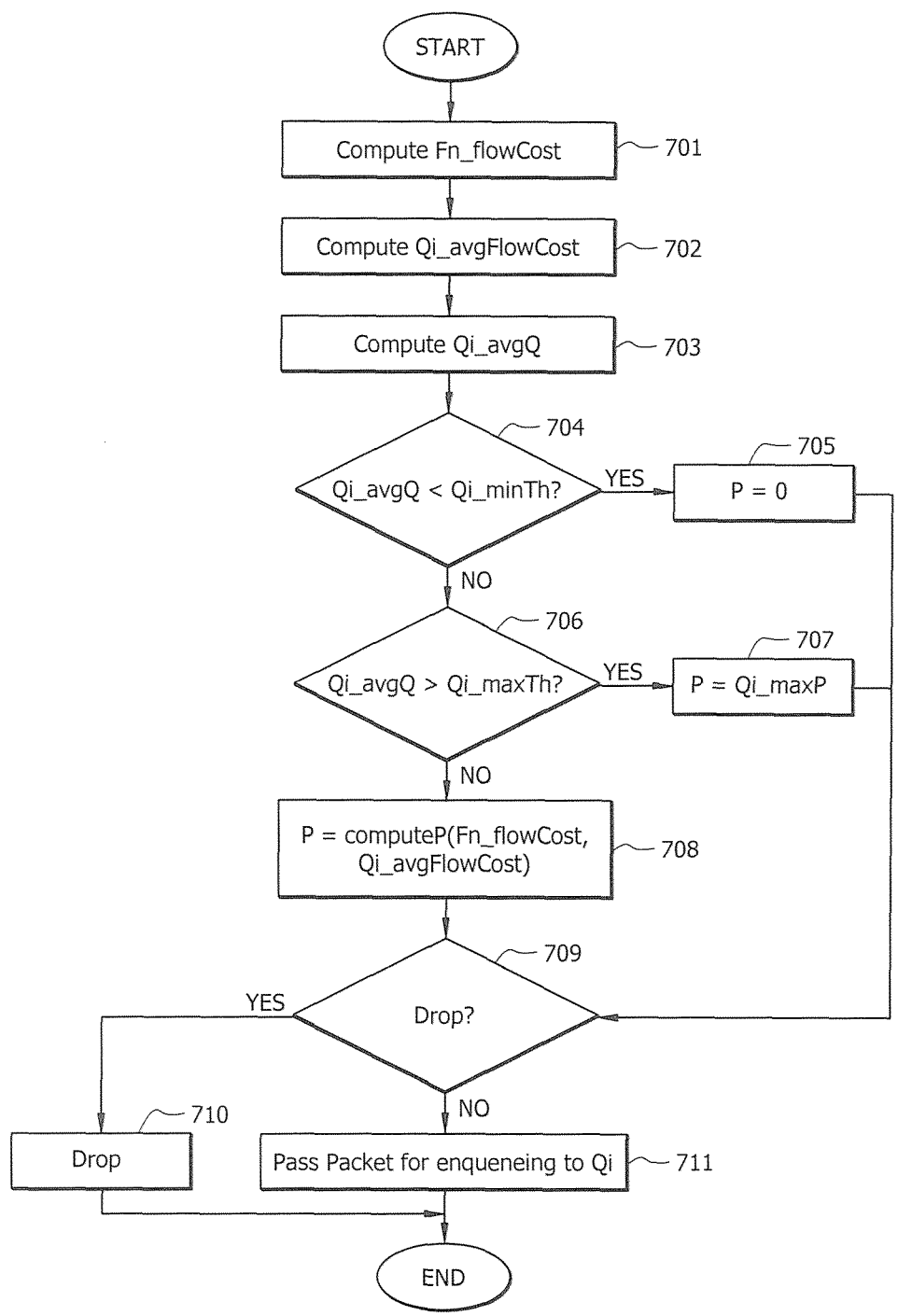

FAIR WEIGHTED NETWORK CONGESTION AVOIDANCE

TECHNICAL FIELD

The present invention relates generally to communications and, more particularly, to network congestion avoidance using fair weighted techniques.

BACKGROUND OF THE INVENTION

Communication systems for carrying various payload, such as data, sound, video, etc., are becoming nearly ubiquitous. For example, telecommunication systems, such as the public switched telephone network (PSTN), cellular telephone networks, and personal communication systems (PCS), have been deployed to service a very large percentage of the Earth's population. Additionally, data networks, such as the Internet, wide area networks (WANs), metropolitan area networks (MANs), local area networks (LANs), and wireless local area networks (WLANs), are widely available in most urban areas.

The use of such communication networks has become widespread, resulting in not only a large amount of payload traffic being carried by the communication networks but also a wide variety of payload traffic being carried. For example, voice (whether digital or analog), multimedia, text, and image payload are all regularly carried by communication networks.

The widespread use of such communication networks, however, often results in periods of network congestion. Specifically, if unchecked, payload communication volume over a particular network may reach a critical point wherein the network traffic is unacceptably affected (e.g., delayed, degraded, blocked, etc.), communication sessions or connections are dropped, network nodes are unable to function properly, and the like. The foregoing network traffic critical point is referred to herein as network congestion, such that network congestion as used herein means congestion reaching a critical or predefined level as may be defined by network parameters, one or more pre-selected threshold value, a network protocol, a network operator, network users, etc.

Various schemes for avoiding network congestion have been tried. Network congestion avoidance in such schemes was implemented by dropping communication session packets as network traffic reaches or nears network congestion. Such network congestion avoidance schemes are typically implemented with respect to one or more nodes in the network, such as within routers, switches, gateways, servers, etc.

For example, random early detection (RED) RED operates to prevent network congestion as may be experienced at a particular network node by dropping packets before a networking device's buffer capacity is exhausted. Specifically, a network device operating in accordance with a RED algorithm monitors average queue size and assigns a packet dropping probability (P) to each packet based upon the average queue length. The higher packet dropping probability assigned to a packet, the more likely that particular packet is to be dropped. Accordingly, packets will be statistically dropped in accordance with the level of network traffic as represented by the queue length. Operation of a RED algorithm to assign packet dropping probabilities to packets is illustrated in FIG. 1. As can be seen in FIG. 1, if the queue is almost empty (the average queue length is less than minThr), all incoming packets are accepted (i.e., the packet dropping probability is zero, P=0). However, as the average queue length increases, the probability for dropping an incoming packet also increases. When the queue is full (the average queue length is equal to maxThr), the packet dropping probability will be maximum (i.e., the packet dropping probability is maxP, P=maxP, wherein maxP is typically 1 meaning that the packet will be dropped) and most, if not all, of the incoming packets are dropped. When the average queue length falls between the lower threshold and upper threshold (i.e., minThr<avgQ<maxThr) the packet dropping probability will be assigned as a function of the average queue length and the range established by the thresholds (e.g., P=maxP(avgQ−minThr)/(maxThr−minThr)).

Although providing some level of network congestion avoidance, there are a number of imperfections in the performance of RED. For example, the present inventors have observed that dropping packets based solely on average queue length does not always lead to fair bandwidth sharing. That is, the loss rate encountered by all connections is the same as they are each assigned the same packet dropping probability at any particular time. This implies that as traffic levels approach network congestion, the more buffers a communication session or connection occupies, the more the packets will be dropped from that connection. However, this does not always lead to fair bandwidth sharing among the connections due to the different behavior of various connection protocols, such as transport control protocol (TCP) and user datagram protocol (UDP). TCP is an adaptive protocol and will react to packet loss experienced by a connection by slowing the transmission of packets for that connection. However, UDP is not an adaptive protocol, and thus UDP will not react to packet loss experienced by a connection. Accordingly, as shown in FIGS. 2A and 2B, wherein portions 201 and 202 of the UDP and TCP transmission bandwidth, respectively, are dropped through operation of a RED algorithm, the TCP transmissions will be reduced in response to the packet loss. Accordingly, although dropping the same percentage of packets from each of these connections, reduced TCP transmissions will quickly result due to the adaptive nature of TCP whereas the UDP transmissions will not be reduced. This allows the UDP connection to obtain an unfair share of the network bandwidth.

Moreover, RED applies the technique equally to all communications and thus does not accommodate quality of service (QoS) or other priority communication schemes. That is, RED treats all classes of service the same. Therefore, a high priority connection and a low priority connection will both experience the same packet dropping probability. Such a result is not consistent with implementing a QoS application.

Weighted random early detection (WRED) operates to prevent network congestion as may be experienced by a particular network node by dropping packets similar to RED, but adds weighting in packet dropping decision making to accommodate QoS applications. Specifically, WRED combines the capabilities of a RED algorithm with a priority-based feature to provide for preferential traffic handling of higher priority packets. WRED operates to discard packets associated with lower priority traffic when the network node begins to experience congestion. Although WRED will also discard packets associated with higher priority traffic, such higher priority traffic packets will be discarded at a lower probability (rate), and/or at a point when the network is more congested, than packets of the lower priority packets. Accordingly, WRED provides differentiated performance characteristics for different classes of service.

The foregoing differentiated performance for different classes of service is illustrated in FIG. 3. In FIG. 3, lines 301 and 302 represent the drop probabilities for 2 different classes of service (queues). Specifically, in the embodiment of FIG. 3, line 301 represents the drop probability for lower priority connections (x) and line 302 represents the drop probability for higher priority connections (y). In the illustrated embodiment, for a given average queue length, a higher priority connection will always experience lower drop probability than that of a lower priority connection. Also, packets from a lower priority connection will be dropped at an earlier stage of congestion as "Qx_minTh" is smaller than "Qy_minTh".

Although WRED provides limited preferential traffic handling for packets associated with higher priority traffic, the present inventors have observed that WRED suffers from the unfair bandwidth sharing problems of RED discussed above. That is, dropping packets based solely on average queue length, although implementing weighting as between different classes of service, continues to result in unfair bandwidth sharing between and within the different classes of service.

Flow random early detection (FRED) operates to prevent network congestion as may be experienced by a particular network node by dropping packets similar to RED, but packet dropping probability is based upon buffer usage associated with a flow (i.e., a connection using TCP or UDP). Specifically, FRED uses per-active-flow accounting to impose a packet loss rate resulting from packet dropping that depends on the flow's buffer usage to improve fairness.

As shown in FIG. 4, FRED introduces the parameters to the packet dropping decision making to establish goals for the minimum (minq) and maximum (maxq) number of packets each flow should be allowed to buffer. FRED maintains a count of buffered packets (qBuf) for each flow that currently has any packets buffered. When qBuf for a particular flow is less than minq, the packet dropping probability is zero (P=0) resulting in no packets of that flow being dropped. Correspondingly, when qBuf for a particular flow is greater than maxq, the packet dropping probability is one (P=1) resulting in all packets of that flow being dropped. However, when qBuf for a particular flow is between minq and maxq, packet dropping probability (P) is assigned to packets of the flow based upon the average queue length, as with RED discussed above.

FRED introduces the global parameter which is an estimate of the average per-flow buffer count (avgqBuf). FRED also introduces a parameter which counts the number of times the flow exceeds maxq (strike). FRED operates to penalizes flows with high strike values using the aforementioned avgqBuf. Specifically, flows with high strike values are not allowed to queue more than avgqBuf packets, thereby preventing those flows from having more packets than the average flow. This allows adaptive flows (e.g., TCP) to send bursts of packets, but prevents non-adaptive flows (e.g., UDP) from consistently monopolizing the buffer space. Accordingly, using these parameters, flows with fewer than avgqBuf packets queued are favored over flows with more.

The foregoing notwithstanding, deficiencies still remain in the use of FRED. For example, if a flow uses more than minq buffers and the average queue size (avgQ) is larger than minThr, FRED will drop packets with probability proportional to the avgQ. Thus, in this region of operation, FRED may demonstrate the same kind of bandwidth unfairness as identified above with respect to RED. FRED will impose the same loss rate on all the flows that have more than minq packets buffered, regardless of how much bandwidth they are using. As with RED discussed above, FRED does not support QoS differentiation.

Moreover, the packet dropping probability of a flow in FRED depends upon the number of packets that flow has buffered. Although this scheme may first appear to be a more fair allocation of bandwidth, the present inventors have discovered that such an allocation of buffers can yield very different fairness properties from a truly fair allocation of bandwidth. Where variable packet sizes are used, the larger the packet size, the more bandwidth that will be used. Likewise, where variable data rates are used (e.g., variable modulation techniques are employed), the slower the data rate the more bandwidth that is needed to transmit the same amount of data. Accordingly, fair allocation of packet buffers does not imply truly fair allocation of bandwidth when the packet size and/or the physical transmit data rate is different.

BRIEF SUMMARY OF THE INVENTION

The present invention is directed to systems and methods which provide network congestion avoidance implementing a fairness scheme in which a cost function is used. According to embodiments of the invention, a transmission "cost" is determined for use in packet dropping and/or link control (e.g., admission control, readmission control, session termination control, etc.) decisions. For example, transmission cost may be determined from one or more of an amount of air time needed to transmit a data packet, a transmission data rate, a size of a packet, an amount of spectral energy (e.g., transmit power associated with transmission and/or receive signal strength associated with signal reception), etc. Network congestion avoidance is implemented according to embodiments of the invention, using such transmission costs, to provide a fair, cost based allocation of network communications.

Embodiments of the invention operate to calculate a current flow cost associated with a particular flow or connection and an average flow cost associated with a queue or buffer (e.g., an average flow cost for a particular class of service). A packet dropping probability for a particular packet is then preferably determined as a function of the current flow cost and average flow cost. Additionally or alternatively, a link dropping probability for a particular communication session, connection, flow, etc. may be determined as a function of the current flow cost and average flow cost. Similarly, a link initiation probability for a particular communication session, connection, flow, etc. may be determined from cost functions of embodiments of the invention. Such cost based techniques provides for a more truly fair allocation of network communications resources, such as bandwidth and/or spectral energy, than is available using the buffer based determinations of the prior art.

Embodiments of the invention further operate to implement buffer based packet dropping probability calculation for use in addition to or in the alternative to the foregoing cost based packet dropping probability calculation. For example, where usage patterns result in all flows or connections having current flow costs very near the average flow cost, a buffer based packet dropping probability calculation may be employed to avoid a situation where fair allocation would otherwise result in network congestion.

Cost based packet dropping probability calculation and buffer based packet dropping probability calculation implemented according to embodiments of the invention are adapted to accommodate QoS applications. For example, different packet dropping probabilities are preferably assigned in association with class of service in operation according to embodiments of the invention.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWING

For a more complete understanding of the present invention, reference is now made to the following descriptions taken in conjunction with the accompanying drawing, in which:

FIG. 7 shows a flow diagram of operation to provide the drop test of FIG. 6 according to an embodiment of the present invention.

DETAILED DESCRIPTION OF THE INVENTION

Figure 1:
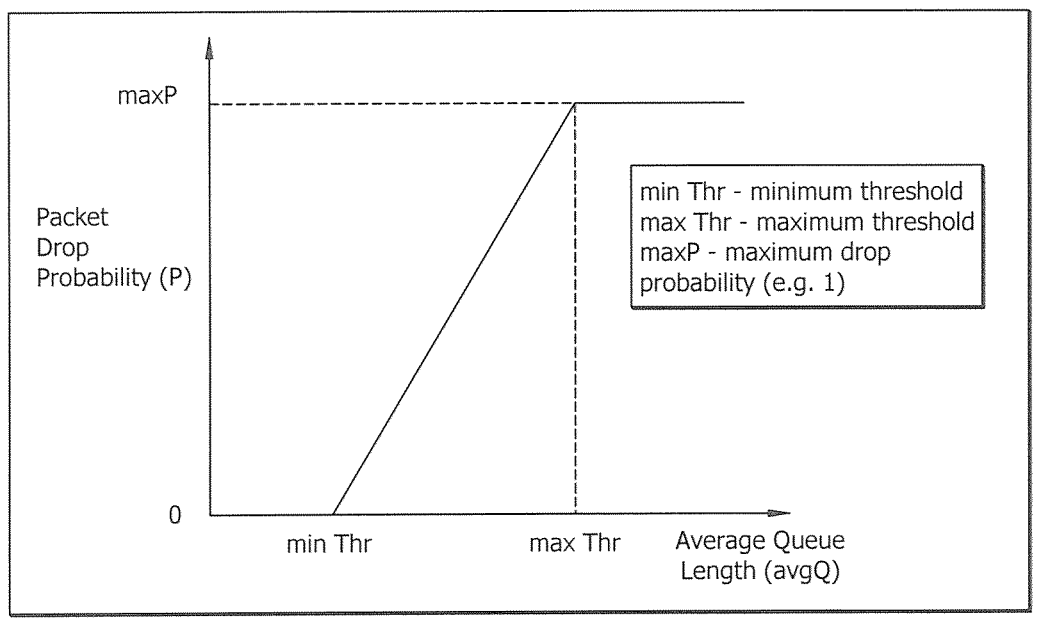
FIG. 1 illustrates operation of a random early detection (RED) algorithm to assign packet dropping probabilities to packets according to the prior art.
Figure 2A:
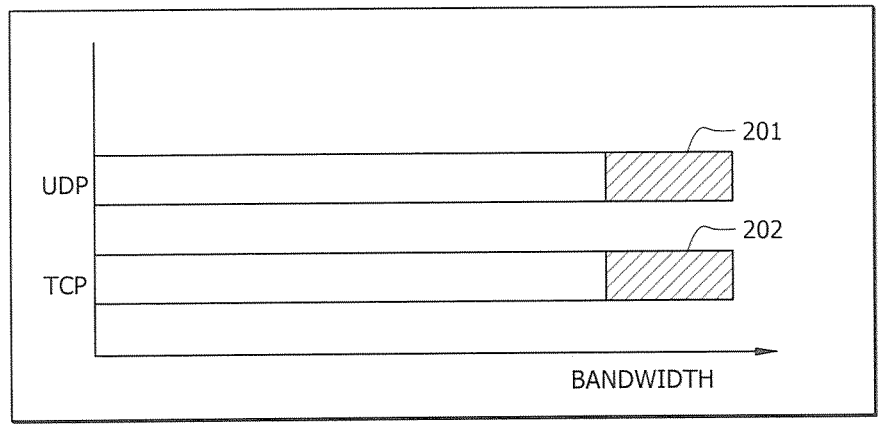
FIGS. 2A and 2B illustrate unfair bandwidth utilization resulting from operation of the prior art RED algorithm of FIG. 1.
Figure 2B:
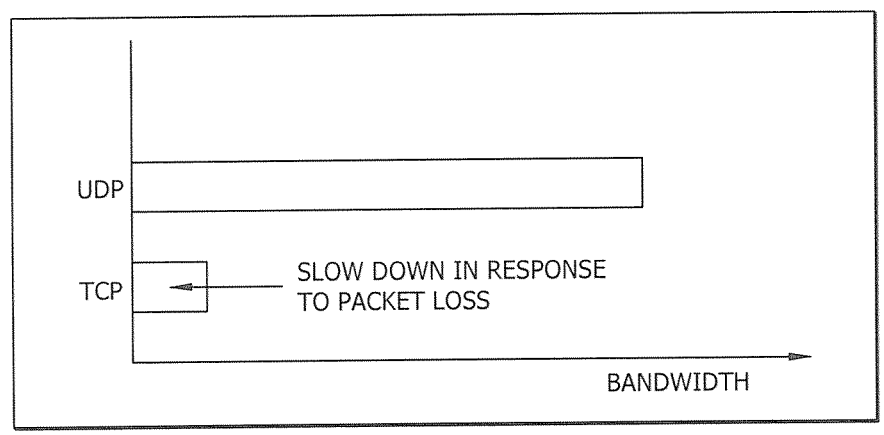
Figure 3:
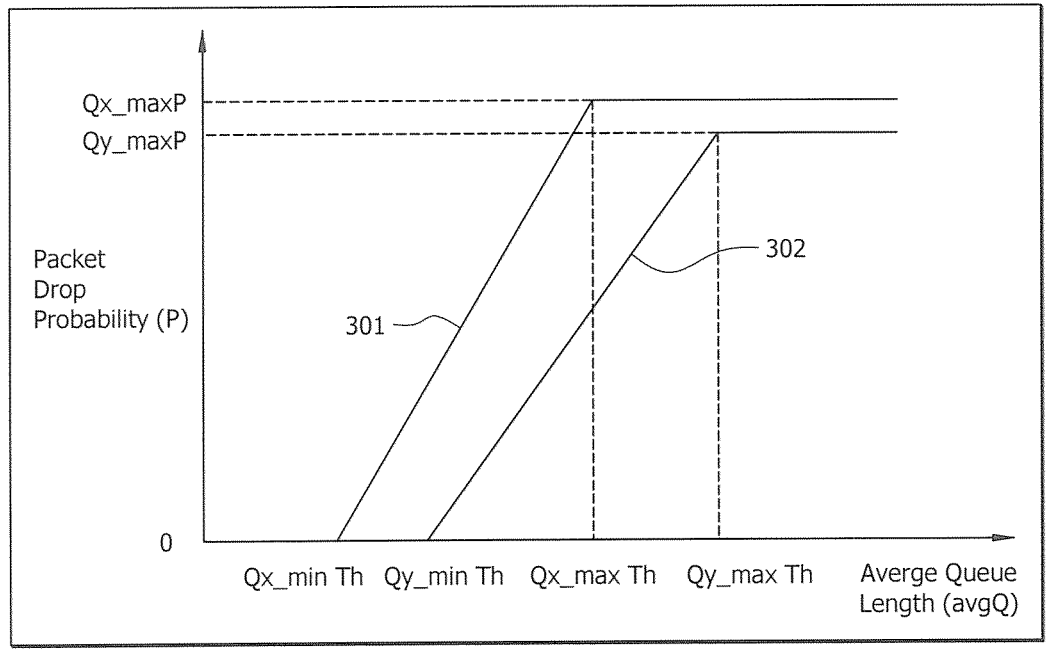
FIG. 3 illustrates operation of a weighted random early detection (WRED) algorithm to assign packet dropping probabilities to packets according to the prior art.
Figure 4:
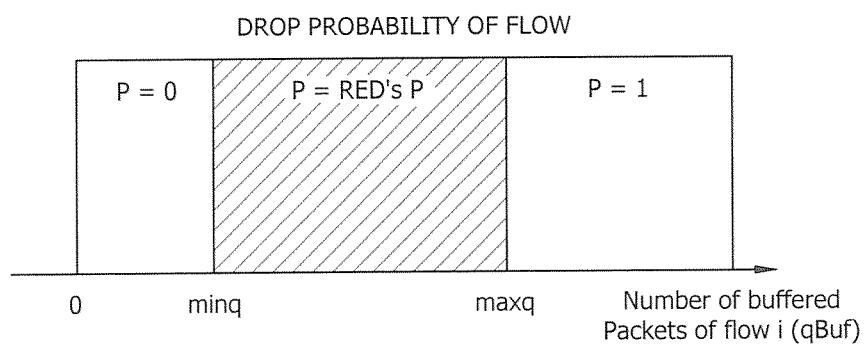
FIG. 4 illustrates operation of a flow random early detection (FRED) algorithm to assign packet dropping probabilities to packets according to the prior art.
Figure 5:
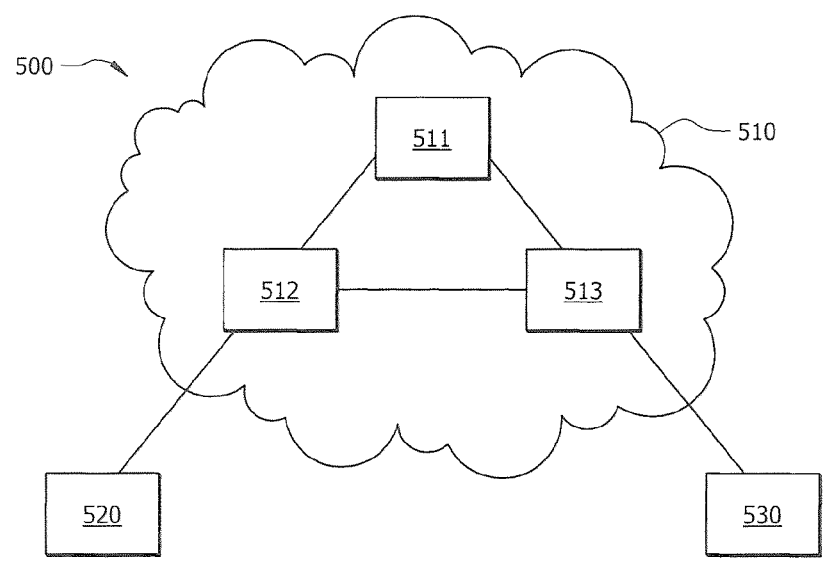
FIG. 5 shows a communication system adapted to provide fair weighted random early detection (FWRED) according to an embodiment of the present invention.

Directing attention to FIG. 5, a communication system adapted according to an embodiment of the present invention is shown. Specifically, communication system 500 of the illustrated embodiment includes network 510 facilitating communication between network nodes 520 and 530. Network 510 may comprise the Internet, an intranet, an extranet, a local area network (LAN), a metropolitan area network (MAN), a wide area network (WAN), a satellite communication network, a cable transmission network, the public switched telephone network (PSTN), and the like, as well as combinations thereof. Communication links provided by network 510 may comprise wireline links, wireless links, optical links, etc. Network 501 of the illustrated embodiment comprises network nodes 511-513, such as may comprise switches, routers, gateways, servers, terminals, etc., facilitating network communications and/or providing communication of information. Such network nodes are preferably processor-based systems, having a central processing unit (CPU), memory, and instruction set, adapted or adaptable to provide operation as described herein. Of course, network nodes in addition to or in the alternative to the foregoing network nodes may be included in, or in communication with, network 510.

Network nodes 520 and 530 may comprise various configurations, such as switches, routers, gateways, servers, terminals, etc., although embodiments described herein will be discussed with reference to network nodes 520 and 530 comprising termination devices, such as servers and terminals. As with network nodes 511-513 described above, network nodes 520 and 530 are preferably processor-based systems, having a central processing unit (CPU), memory, and instruction set.

Embodiments of the present invention implement a fair weighted random early detection (FWRED) network congestion avoidance scheme. The FWRED network congestion avoidance scheme of preferred embodiments is implemented in or by one or more network nodes, such as network nodes 511-513, 520, and/or 530. For example, one or more of the foregoing network nodes may implement an instruction set, in the form of computer executable code operable upon a CPU thereof, so as to provide FWRED network congestion avoidance at the network node. Accordingly, embodiments of the invention may comprise a computer program product having computer executable code stored on a computer readable medium, wherein the computer program product comprises code for providing the functionality as described herein.

Implementing such FWRED network congestion avoidance at multiple nodes throughout communication system 500 facilitates a robust deployment wherein network congestion is avoided throughout the system. For example, implementing FWRED network congestion avoidance at network node 512 may operate to minimize the impact on network nodes 511, 513, and 530 of "unfair" communications originating from network node 520. Cooperatively, implementing FWRED network congestion avoidance at network node 513 may operate to minimize the impact on network nodes 511, 512, and 520 of "unfair" communications originating from network node 530. Where multiple instances of FWRED network congestion avoidance are implemented in a communication system, it should be appreciated that the various parameters and variables used thereby may be adapted for each such particular instance to accommodate unique attributes thereof, such as bandwidth of a network interface, data rates available, etc.

Embodiments of the invention implement FWRED using a transmission "cost" determination. Such a transmission cost may be determined or estimated from one or more of an amount of air time needed to transmit a data packet, a transmission data rate, a size of a packet, an amount of spectral energy (e.g., transmit power associated with transmission and/or receive signal strength associated with signal reception), etc. to provide a fair allocation of network communications resources. It should be appreciated that the foregoing determinations may be made through analysis of the packet to be transmitted (e.g., such as to determine its length, content, structure, or other characteristics) and/or through analysis of communication system operation (e.g., such as to determine a channel quality, data rate likely to be utilized or historically utilized, a transmit level likely to be utilized or historically utilized, a receive signal strength likely to be experienced or historically experienced).

Where FWRED is implemented to provide link control in addition to or in the alternative to cost determinations made with respect to packets, embodiments of the invention may determine or estimate transmission costs from one or more of an amount of air time needed to transmit a flow, a transmission data rate, a size of a flow, an amount of spectral energy (e.g., transmit power associated with transmission and/or receive signal strength associated with signal reception), etc. to provide a fair allocation of network communications resources. Such determinations may be made using historical information (e.g., historical communication by one or more terminals associated with a session, historical information regarding the type of communication, historical information regarding the communication content, etc.), statistical data (e.g., weighted averages, moving averages, instantaneous utilization, etc.), predictive information (e.g., based upon historical information for the particular terminals, based upon the type of communication, based upon the communication content, etc.).

Link control may be utilized to provide admission control and/or session termination using cost determinations according to embodiments of the invention. For example, a link dropping probability for a particular communication session, connection, flow, etc. may be determined as a function of the current flow cost and average flow cost. Similarly, a link initiation probability for a particular communication session, connection, flow, etc. may be determined from cost functions of embodiments of the invention. Where a link is dropped for congestion control according to embodiments of the invention, the link may have a time period, connection probability, etc. assigned thereto for use in controlling reestablishing a link in the communication network, or perhaps using a same network node associated with the dropping determination. In operation, such link control may not only led to congestion avoidance/mitigation, but may also provide load balancing, such as through dropped links being reestablished through other network nodes (e.g., an access point serving less traffic).

Moreover, FWRED implemented according to embodiments of the invention adopts a technique for dealing with priority queuing, such that each priority queue holds a different set of queue specific parameters. By configuring queue specific parameters appropriately, prioritized packet dropping and/or link control behavior can be achieved for QoS applications according to embodiments of the invention.

To aid in understanding the concepts of the present invention, various terms, parameters, and variables will be used herein below in describing a preferred embodiment. So as to more readily convey the concepts described the intended meaning in the following context for several such terms is being expressly provided. Likewise, descriptions of several of the parameters and variables are being expressly provided.

The term "flow" as used in describing the following embodiments refers to a data stream between two network devices. For example, a flow may comprise a stream of data packets transmitted between two network nodes during a communication session using a network protocol such as TCP, UDP, etc. The term "active flow" refers to a flow that has data to be transmitted, such as data packets buffered in a queue of a network node.

The term "cost" as used in describing the following embodiments refers to a cost of transmission, such as may comprise the cost of transmitting a data packet. For example, in a communication system in which adaptive data rates are used, the cost may be the transmission media time needed to transmit the packet. In a communication system in which variable packet sizes are used, the cost may be the packet size. In a communication system that is interference limited (e.g., a wireless system using code division multiple access (CDMA) protocols, the cost may be spectrum energy or transmit power associated with the transmission of a data packet. Cost as used herein may be derived from a plurality of parameters, such as a combination of transmission media time and data packet size, according to embodiments of the invention.

Queue specific parameters used with respect to embodiments described below include $Q_i\_MinTh$, $Q_i\_maxTh$, and $Q_i\_maxP$. The $Q_i\_minTh$ parameter as used herein provides a minimum threshold for packet dropping and/or link control for queue i. The $Q_i\_maxTh$ parameter as used herein provides a maximum threshold whereat a maximum packet dropping and/or link dropping probability is assigned to packets and/or link control probability is assigned to sessions, connections, or flows of queue i. The $Q_i\_maxP$ parameter as used herein provides a maximum packet and/or link dropping probability that is to be assigned to packets and/or maximum link dropping probability that is to be assigned to sessions, connections, or flows of queue i (e.g., $0 \leq Q_i\_maxP \leq 1$). In each of the foregoing, the higher the class of service or the higher the priority associated with queue i, the higher the minimum threshold for dropping (e.g., the $Q_i\_minTh$ parameter) and the threshold for assigning maximum dropping probability (e.g., the $Q_i\_maxTh$ parameter) and the lower the maximum dropping probability to be assigned (e.g., the $Q_i\_maxP$ parameter).

Queue specific variables used with respect to embodiments described below include $Q_i\_avgFlowCost$, $Q_i\_flowNum$, $Q_i\_avgQ$, and $Q_i\_curQ$. The $Q_i\_avgFlowCost$ variable as used herein provides an average cost among all the active flows in queue i. The $Q_i\_flowNum$ variable as used herein provides a current number of active flows in queue i. The $Q_i\_avgQ$ variable as used herein provides an average queue length of queue i. The $Q_i\_curQ$ variable as used herein provides a current queue length of queue i.

Flow specific variables used with respect to embodiments described below include $F_n\_flowCost$. The $F_n\_flowCost$ variable as used herein provides a cost of flow n.

The foregoing variables are used in a FWRED algorithm of embodiments to compute dropping probabilities. When used in combination with the foregoing parameters, a robust network congestion avoidance scheme, providing cost based fairness, may be implemented as described herein below.

Figure 6:
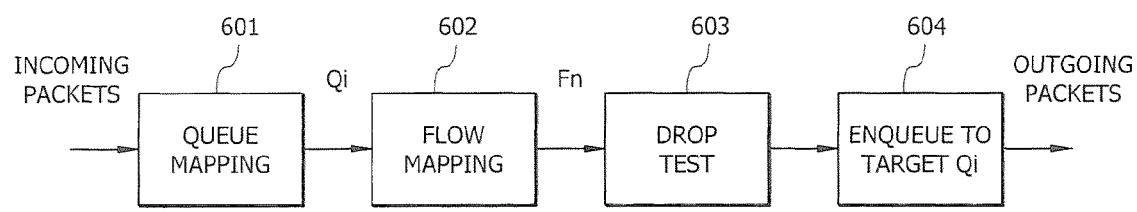
FIG. 6 shows a high level functional block diagram of a system implementing FWRED network congestion avoidance according to an embodiment of the present invention.

Directing attention to FIG. 6, a high level functional block diagram showing operation of FWRED network congestion avoidance according to an embodiment is shown. Specifically, functional blocks for mapping incoming packets to appropriate queues (queue mapping 601), mapping the packets for each queue to their respective flows (flow mapping 602), packet dropping probability determination and implementing packet dropping (drop test 603), and enqueuing packets which are not dropped in the appropriate queues (enqueue to target Qi) are shown. These functional blocks may be implemented in one or more network nodes. For example, queue mapping 601, flow mapping 602, drop test 603, and enqueue to target Qi 604 may be implemented as computer executable code in any or all of network nodes 511-513, 520, and 530. Accordingly, embodiments of the invention may comprise a computer program product having computer executable code stored on a computer readable medium, wherein the computer program product comprises code for providing the functionality as described herein.

In operation according to a preferred embodiment, when an incoming packet arrives, it will be assigned to a particular priority queue (Qi) by queue mapping 601. For example, packet header information may identify the packet with a particular class of service, as having a particular priority level, as being associated with a flow (e.g., between network nodes 520 and 530) having a guaranteed QoS, etc. Using the foregoing information, queue mapping 601 of the illustrated embodiment preferably assigns incoming packets to an appropriate queue (Qi).

Additionally, the packet is identified with a particular flow, whether a new flow or an ongoing flow, by flow mapping 602 of the illustrated embodiment. For example, each incoming packet may be tagged with flow identification information (Fn), identifying the packet with a particular flow, by flow mapping 602. Such flow mapping may be based on information such as the source internet protocol (IP) address, the destination IP address, the destination port, etc. Additionally or alternatively flow mapping may be based on user identification information, such as association identification as used in WiFi (IEEE 802.11) systems.

Using the parameters and variables for the assigned queue (Qi) and the particular flow (Fn) associated with the packet, drop test 603 of preferred embodiments operates to determine a packet dropping probability and implement packet dropping. That is, the determination with respect to dropping a packet by drop test 603 will be made based on the queue specific parameters and variables of Qi (the queue that the incoming packet is to be delivered to) and the flow specific variables of Fn (the flow that the incoming packet belongs to). According to embodiments of the invention, only if the packet is not dropped by drop test 603 is the packet passed on to its assigned queue to await transmission/re-transmission within communication system 500.

Packets which are not dropped by drop test 603 proceed to enqueue to target Qi 604 of the illustrated embodiment wherein the packet will be enqueued to the target queue Qi. The queue will operate to hold the packet for placing, in turn, on one or more appropriate network links by the host network node.

Directing attention to FIG. 7, detail with respect to the operation of drop test 603 to determine packet dropping probabilities and implementing packet dropping according to a preferred embodiment is shown. In the following discussion, operation of drop test 603 with respect to a data packet according to a preferred embodiment is described. It should be appreciated that such operation is preferably repeated for each data packet to be transmitted by the host network node. Accordingly, the data packets may be associated with different flows and queues. Each such operation may thus use parameters and variables appropriate to the particular flow and/or queue associated with a data packet then being processed. According to embodiments of the invention, packet dropping may be implemented with respect to one or more queues, perhaps with parameters and variables appropriate to the individual queues, and may not be implemented with respect to one or more other queues.

At block 701, a cost (Fn_flowCost) associated with flow (Fn) transmission is determined. For example, the flow cost, Fn_flowCost, may be calculated from the total cost needed to transmit the currently untransmitted packets associated with the flow. According to embodiments, Fn_FlowCost is calculated from all the packets of flow Fn in queue Qi and the incoming packet of flow Fn.

At block 702, an average cost (Qi_avgFlowCost) associated with the queue (Qi) assigned to the flow (Fn) is determined. For example, the average queue cost, Qi_avgFlowCost, may be calculated from the sum of the flow costs (Fn_flowCost) for each active flow assigned to the queue, Qi, divided by the number of active flows assigned to the queue. This relationship is shown in the following equation:

$$Qi\_avgFlowCost = \sum_{1}^{N} Fn\_flowCost / Qi\_flowNum \quad (1)$$

where $n = 1$ to $N$.

At block 703, an average queue length (Qi_avgQ) associated with the queue (Qi) assigned to the flow (Fn) is determined. For example, the average queue length, Qi_avgQ, of queue Qi may be calculated from summing weighted values of a previous average queue length and a current average queue length. Such a calculation is shown in the following equation:

$$Qi\_avgQ = (1-w)Qi\_avg + (w)Qi\_curQ \quad (2)$$

where w is an averaging weight factor. According to preferred embodiments of the invention, an averaging weight factor, w, is selected to be small enough (e.g., 0.05) to provide a long average.

Embodiments of the invention implement network congestion avoidance using packet dropping probability calculation. Additionally or alternatively, embodiments implement minimum and/or maximum thresholds in order to provide fairness with respect to particular usage patterns.

For example, where an average queue length is less than a predetermined minimum threshold queue length, indicating an "underutilized" queue or otherwise suggesting usage patterns which are unlikely to significantly contribute to network congestion, the packet dropping probability may be set to zero or other small value to prevent or minimize dropping of packets from those flows. Accordingly, block 704 of the illustrated embodiment determines whether the average queue length of queue i (Qi_avgQ) is less than the minimum threshold queue length (Qi_minTh). If the average queue length of queue i (Qi_avgQ) is less than the minimum threshold queue length (Qi_minTh), processing proceeds to block 705. At block 705, the packet dropping probability (P) of the illustrated embodiment is set to zero (P=0). However, if the average queue length (Qi_avgQ) is not less than the minimum threshold queue length (Qi_minTh), processing proceeds to block 706.

Likewise, where an average queue length is greater than a predetermined maximum threshold queue length, indicating an "over utilized" queue or otherwise suggesting usage patterns which are highly likely to significantly contribute to network congestion, the packet dropping probability may be set to one or other large value to ensure or maximize dropping of packets from those flows. Accordingly, block 706 of the illustrated embodiment determines whether the average queue length of queue i (Qi_avgQ) is greater than the maximum threshold queue length (Qi_maxTh). If the average queue length of queue i (Qi_avgQ) is greater than the maximum threshold queue length (Qi_maxTh), processing proceeds to block 707. At block 707, the packet dropping probability (P) of the illustrated embodiment is set to a maximum packet dropping probability (P=Qi_maxP) for that queue. However, if the average queue length (Qi_avgQ) is not greater than the maximum threshold queue length (Qi_maxTh), processing proceeds to block 707.

At block 708, a packet dropping probability (P) for the data packet is determined. For example, if the average queue length of queue i (Qi_avgQ) is between the foregoing minimum and maximum queue length thresholds, the packet dropping probability (P) may be linearly proportional to the cost associated with flow n (Fn_flowCost) so as to progressively penalize flows that have a high cost associated therewith.

Moreover, embodiments of the invention are adapted to provide for network congestion avoidance with respect to usage patterns wherein the cost associated with flow n (Fn_flowCost) is small (thus leading to a low packet dropping probability wherein packet dropping probability is linearly proportional to the cost) and the average queue length (Qi_avgQ) is large (e.g., at or near the point of network congestion). Accordingly, the packet dropping probability (P) may alternatively be linearly proportional to the average queue length (Qi_avgQ) when the cost associated with flow n (Fn_flowCost) is small and the average queue length (Qi_avgQ) is large, according to embodiments of the invention.

A packet dropping probability determination, as may be used to implement the foregoing concepts in block 708, is provided using the following calculations:

$$Pa = Qi\_maxP(Fn\_flowCost - Qi\_avgFlowCost)/Qi\_avgFlowCost \quad (3)$$

$$Pb = Qi\_maxP(Qi\_avgQ - Qi\_minTh)/(Qi\_maxTh - Qi\_minTh) \quad (4)$$

$$\text{IF } MAX(Pa, Pb) < Qi\_maxP \text{ THEN } P = MAX(Pa, Pb)$$
$$\text{ELSE } P = Qi\_maxP \quad (5)$$

In the foregoing, Pa provides a packet dropping probability to penalize flows that have cost larger than the average cost, and Pb provides a packet dropping probability which increases with average queue length. The final packet dropping probability (P) selected using equations (3)-(5) is the maximum value among Pa and Pb, unless that value is greater than Qi_maxP in which case the value of Qi_maxP is selected. Accordingly, Pb provides a packet dropping probability to protect the buffer resources when the average queue length is long. That is, Pb operates to protect against the case where Pa is very small (all flows have close to or below average cost) and the average queue length is long.

At block 709, a determination as to whether to drop the incoming packet or to pass the incoming packet to its assigned queue is made. According to embodiments, a packet dropping decision will be made based upon the packet dropping probability (P) determined for the particular data packet. For example, where the packet dropping probability is set to zero (P=0), the packet will not be dropped and instead will be passed to the assigned queue. Where the packet dropping probability is set to one (P=1), for example, the packet will be dropped and thus will not be passed to the assigned queue. Where the packet dropping probability is between zero and one (0<P<1), the packet may, for example, be subjected to a probabilistic engine such that a packet dropping decision is made to drop the packet or not in accordance with the assigned packet dropping probability (P). Such a probabilistic engine may utilize a random number generator and a scale demarcated with the packet dropping probability (P), such that a random number falling on one side of the packet dropping probability scale results in a "yes drop" determination and falling on the other side of the packet dropping probability scale results in a "no drop" determination.

If it is determined that the packet is to be dropped, processing proceeds to block 710 wherein the packet is dropped. However, if it is determined that the packet is not to be dropped, processing proceeds to block 711 wherein the packet is enqueued in the assigned queue (Qi) to await transmission or further transmission in the communication system.

The foregoing process is preferably performed with respect to each data packet received or to be transmitted by a host network node. It should be appreciated, however, that the particular parameters used, such as the minimum and maximum queue length thresholds and averaging weight factor, may be unique to a particular queue, such as to accommodate QoS applications or other priority based operation.

Although the foregoing example embodiments have been discussed with reference to packet dropping to provide congestion avoidance, it should be appreciated that such embodiments may be readily adapted to provide admission control and/or session termination in addition to or in alternative to packet dropping. For example, a soft metric approach may be implemented wherein a dropping probability which increases with average queue length (e.g., Pb of equation (4)) is used as a probability that a link is to be dropped (Plink_drop). Preventive link dropping can be achieved using the foregoing to avoid congestion according to such an embodiment. For example, the link drop probability may be determined as set forth below.

$$Plink\_drop = \{0, \text{ if } Qi\_avgQ < Qi\_minTh \quad (6)$$

$$Qi\_maxP(Qi\_avgQ - Qi\_minTh)/(Qi\_maxTh - Qi\_minTh), \text{ if } Qi\_minTh < Qi\_avgQ < Qi\_maxTh \quad (7)$$

$$Qi\_maxP, \text{ if } Qi\_avgQ > Qi\_maxTh \quad (8)$$

The probability a particular link (link "i") is dropped, using equations (6)-(8) above, is 0 if the average queue length of queue i is less than the minimum threshold for link control for queue i, is a function of a maximum link dropping probability and average queue length of queue i if the average queue length of queue i is greater than the minimum threshold for link control for queue i and less than the maximum threshold for link control for queue i, and is the maximum link dropping probability if the average queue length of queue i is greater than the maximum threshold for link control for queue i. A probability function based on the relative flow cost for each link, for example, may be used for selecting which link to drop. According to an embodiment, the probability of a link being selected is as follows:

$$Plink\_select = \sum_{\text{All flow belong to link } n} Fn\_flowCost \Big/ \sum_{\text{All flow belong to queue } i} Fn\_flowCost \quad (9)$$

In operation according to the foregoing example, when a link is determined to be dropped based on Plink_drop, the particular link to be dropped would be selected based on the probability distribution of Plink_select. After a link is dropped, all packets associated with the dropped link are preferably dropped and a recalculation of average queue lengths and flow costs may be performed in order to prevent further unnecessary link dropping (e.g., dropping an additional link without taking into consideration the decrease in resource utilization resulting from a link having been dropped).

As another example of implementing link dropping according to the concepts of the present invention, a link dropping probability for a particular communication session, connection, flow, etc. may be determined as a function of the current flow cost and average flow cost as set forth below.

$$Plink\_drop = \{0, \text{ if } Qi\_avgQ < Qi\_Drop\_Threshold \quad (10)$$

$$1, \text{ if } Qi\_avgQ > Qi\_Drop\_Threshold \quad (11)$$

Through use of the foregoing link dropping equations (equations (10) and (11)), a link may be selected to be dropped when the average queue link reaches a predetermined threshold in order to mitigate the traffic congestion. A cost function (e.g., total flow cost for a link=summation of Fn_flowCost) may be used to choose the particular link to be dropped. Thus, when the link drop probability results in a determination that a link is to be dropped, the link which has the highest cost would be dropped. In operation according to a preferred embodiment, after a link is dropped, all packets associated with the dropped link are correspondingly dropped. A recalculation of average queue lengths and flow costs is preferably performed after a link is dropped in order to prevent further unnecessary link dropping.

In the foregoing example, different queues having different priorities may be accommodated by choosing different thresholds for the different queues. For example, the higher the queue priority the lower the link drop threshold selected and vice versa.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method comprising:
    determining a flow cost associated with a flow with which a data packet is associated;
    determining a queue length of a queue assigned to said data packet; and
    implementing a network congestion avoidance scheme by a processor-based network node by assigning a packet dropping probability to said data packet as a function of said flow cost and said queue length, wherein said implementing said network congestion avoidance scheme comprises:
        determining a first packet dropping probability for said data packet as a function of said flow cost, said first packet dropping probability being a flow cost based packet dropping probability,
        determining a second packet dropping probability for said data packet as a function of a queue length of a queue assigned to said data packet, said second packet dropping probability being a buffer based packet dropping probability, and
        computing the packet dropping probability using the first and second packet dropping probabilities.

2. The method of claim 1, wherein said implementing said network congestion avoidance scheme further comprises:
    assigning one of said flow cost based packet dropping probability and said buffer based packet dropping probability as said packet dropping probability for said data packet; and
    determining whether to drop said data packet based upon said assigned packet dropping probability.

3. A method comprising:
    determining a flow cost associated with a flow with which a data packet is associated;
    determining a queue length of a queue assigned to said data packet;
    determining a first packet dropping probability for said data packet as a function of said flow cost, said first packet dropping probability being a flow cost based packet dropping probability;
    determining a second packet dropping probability for said data packet as a function of a queue length of a queue assigned to said data packet, said second packet dropping probability being a buffer based packet dropping probability;
    implementing a network congestion avoidance scheme by a processor-based network node by assigning a greater one of said cost based packet dropping probability and said buffer based packet dropping probability as a packet dropping probability for said data packet; and
    determining whether to drop said data packet based upon said assigned packet dropping probability.

4. A method comprising:
    determining a flow cost associated with a flow with which a data packet is associated;
    determining a queue length of a queue assigned to said data packet;
    determining a first packet dropping probability for said data packet as a function of said flow cost, said first packet dropping probability being a flow cost based packet dropping probability;
    determining a second packet dropping probability for said data packet as a function of a queue length of a queue assigned to said data packet, said second packet dropping probability being a buffer based packet dropping probability;
        implementing a network congestion avoidance scheme by a processor-based network node by
    assigning one of said flow cost based packet dropping probability and said buffer based packet dropping probability as a packet dropping probability using a weighted average of each of said flow cost based packet dropping probability and said buffer based packet dropping probability; and
    determining whether to drop said data packet based upon said assigned packet dropping probability.

5. A method comprising:
    determining a cost associated with transmission of a data packet; and
    implementing a network congestion avoidance scheme by a processor-based network node using said determined cost, wherein said implementing said network congestion avoidance scheme comprises:
        determining a first packet dropping probability for said data packet as a function of said cost, said first packet dropping probability being a cost based packet dropping probability; and
        determining a second packet dropping probability for said data packet as a function of a queue length of a queue assigned to said data packet, said second packet dropping probability being a buffer based packet dropping probability, and wherein said implementing said network congestion avoidance scheme further comprises:
    assigning a greater one of said cost based packet dropping probability and said buffer based packet dropping probability as a packet dropping probability for said data packet if said greater one of said cost based packet dropping probability and said buffer based packet dropping probability is less than a predetermined maximum packet dropping probability;

assigning said predetermined maximum packet dropping probability as a packet dropping probability for said data packet if said greater one of said cost based packet dropping probability and said buffer based packet dropping probability is not less than said predetermined maximum packet dropping probability; and determining whether to drop said data packet based upon said assigned packet dropping probability.

6. The method of claim 5, wherein said implementing said network congestion avoidance scheme further comprises:

assigning a predetermined minimum packet dropping probability as a packet dropping probability for said data packet if an average queue length for a queue assigned to said data packet is less than a minimum queue length threshold; and assigning said predetermined maximum packet dropping probability as a packet dropping probability for said data packet if an average queue length for said queue assigned to said data packet is greater than a maximum queue length threshold.

7. A system comprising:

a network node operating under control of an instruction set to determine a cost associated with transmission of a data packet and implementing a network congestion avoidance scheme using said determined cost; and a queue assigned to said data packet, said queue enqueuing said data packet in accordance with said network congestion avoidance scheme, wherein said instruction set defines operation of said network node to implement said network congestion avoidance scheme using a determination of a first packet dropping probability for said data packet as a function of said cost, said first packet dropping probability being a cost based packet dropping probability, and a determination of a second packet dropping probability for said data packet as a function of a queue length of a queue assigned to said data packet, said second packet dropping probability being a buffer based packet dropping probability, using an assignment of one of said cost based packet dropping probability and said buffer based packet dropping probability as a packet dropping probability for said data packet, and using a packet dropping determination based upon said assigned packet dropping probability.

8. A computer program product having computer executable code stored on a non-transitory computer readable medium, said computer program product comprising:

code for receiving a data packet;

code for determining a flow cost associated with a flow with which said data packet is associated;

code for determining an average flow cost associated with a queue assigned to said data packet;

code for determining a queue length of a queue assigned to said data packet;

code for assigning a packet dropping probability to said data packet as a function of said flow cost and said average flow cost and said queue length, wherein said code for assigning a packet dropping probability comprises:

code for determining a first packet dropping probability for said data packet as a function of said flow cost, said first packet dropping probability being a cost based packet dropping probability; and code for determining a second packet dropping probability for said data packet as a function of a queue length of a queue assigned to said data packet, said second packet dropping probability being a buffer based packet dropping probability; and code for dropping said data packet or passing said data packet to said queue based upon said assigned packet dropping probability.

9. The computer program product of claim 8, wherein said code for assigning said packet dropping probability further comprises:

code for assigning one of said flow cost based packet dropping probability and said buffer based packet dropping probability as a packet dropping probability for said data packet.

10. A computer program product having computer executable code stored on a non-transitory computer readable medium, said computer program product comprising:

code for receiving a data packet;

code for determining a flow cost associated with a flow with which said data packet is associated;

code for determining an average flow cost associated with a queue assigned to said data packet;

code for assigning a packet dropping probability to said data packet as a function of said flow cost and said average flow cost, wherein said code for assigning said packet dropping probability comprises:

code for assigning a predetermined minimum packet dropping probability as a packet dropping probability for said data packet if an average queue length for said queue is less than a minimum queue length threshold; and code for assigning a predetermined maximum packet dropping probability as a packet dropping probability for said data packet if an average queue length for said queue is greater than a maximum queue length threshold;

code for dropping said data packet or passing said data packet to said queue based upon said assigned packet dropping probability, wherein said code for assigning a packet dropping probability comprises:

code for determining a first packet dropping probability for said data packet as a function of said cost, said first packet dropping probability being a cost based packet dropping probability; and code for determining a second packet dropping probability for said data packet as a function of a queue length of a queue assigned to said data packet, said second packet dropping probability being a buffer based packet dropping probability, wherein said code for assigning said packet dropping probability further comprises:

code for assigning one of said cost based packet dropping probability and said buffer based packet dropping probability as said packet dropping probability for said data packet if said one of said cost based packet dropping probability and said buffer based packet dropping probability is less than a predetermined maximum packet dropping probability; and code for assigning said predetermined maximum packet dropping probability as said packet dropping probability for said data packet if said one of said cost based packet dropping probability and said buffer based packet dropping probability is not less than said predetermined maximum packet dropping probability.

11. A method comprising:

determining a flow cost associated with a particular flow with which a data packet is associated;

determining an average flow cost associated with a queue assigned to said particular flow;

determining a queue length of the queue assigned to said data packet;

assigning, by a processor-based network node, a packet dropping probability to said data packet as a function of said flow cost, said average flow cost and said queue length, wherein said assigning said packet dropping probability comprises:

determining a first packet dropping probability for said data packet as a function of said determined costs, and determining a second packet dropping probability for said data packet as a function of said queue length of the queue assigned to said data packet, wherein one of said first packet dropping probability and said second packet dropping probability is assigned to said data packet as said packet dropping probability; and dropping said data packet or passing said data packet to said queue based upon said assigned packet dropping probability.

12. The method of claim 11, wherein said determining said flow cost comprises:

determining a cost associated with transmission of a data packet of said flow.

13. The method of claim 11, wherein said determining said flow cost comprises:

determining a historical cost of transmission of said particular flow.

14. The method of claim 11, wherein said determining said flow cost comprises:

determining a predictive cost of transmission of said particular flow.

15. The method of claim 11, further comprising:

assigning a dropping probability to a communication link associated with said flow as a function of said flow cost.

16. The method of claim 15, further comprising assigning a link reestablishing metric to said communication link.

* * * * *